Patented July 26, 1938

2,124,689

UNITED STATES PATENT OFFICE 2,124,689

BROWN AZO DYES

Herbert W. Daudt, Wilmington, Del., and Harold E. Woodward, Penns Grove, N. J., assignors to E. I. du Pont de Nemours & Company, Wilmington, Del., a corporation of Delaware No Drawing. Application March 25, 1937, Serial No. 132,969

16 Claims. (Cl. 260—81)

This invention relates to azo dyestuffs, to processes of making the dyestuffs and to materials dyed therewith, and especially to hydroxy secondary disazo dyes, their esters and ethers.

Heretofore brown azo dyes suitable for dyeing wool have been described which resemble in some respects the dyes hereinafter to be described. However, they have various undesirable properties, being sensitive to alkali and showing a tendency to bleeding when wet. In general it is necessary to dye with them in acid baths. It is useful to have wool dyes which will operate in neutral baths, and it is desirable to provide new dyestuffs with improved properties and processes for producing the compounds.

It is an object of this invention to provide new dyes suitable for dyeing animal fibres, such as silk and wool, in neutral baths. Another object of the invention is to provide new wool dyes of desirable bright shades having good fastness to washing and fulling. Another object of the invention is to provide processes for making the new compounds. Other objects are to provide animal fibres dyed with the new compounds and processes of dyeing the same. Still other objects will be apparent from the following more detailed description of the invention.

The objects of the invention are accomplished generally by the following procedure. A diazotized 4-nitro-4'-amino-diphenylamine-sulphonic acid is coupled to a coupling component containing a primary amine group having a free coupling position which is non-adjacent to the amino group. The amino group must be capable of being diazotized after the monazo compound is formed. The monazo compound is diazotized and coupled with a hydroxy aryl compound. The hydroxy group of the disazo compound is then blocked by condensing the hydroxy group with suitable compounds to form desired esters and ethers.

The term aryl as used in the specification and claims refers generally to aromatic compounds of the benzene and naphthalene series.

The invention is illustrated but not limited by the following examples.

Example I 30.9 parts of 4-nitro-4'-amino-diphenylamine-2-sulfonic acid were dissolved in 500 parts of water at 60° C. with 5.3 parts of sodium carbonate and then 6.9 parts of sodium nitrite were added to the solution. This solution was then run during 30 minutes into 250 parts of normal HCl solution and enough ice was added to keep the temperature at 25–30° C.

21 parts of sodium acetate (crystals) were then added to the mixture containing the diazotized 4-nitro-4'-amino-diphenylamine-2-s u l p h o n i c acid, and to this was added a solution containing 13.7 parts of cresidine (3-amino-4-methoxy toluene) in 200 parts of water and 50 parts of 2X normal HCl solution. After stirring for one hour 150 parts of 2X normal sodium carbonate solution were aded to make the solution slightly alkaline. The monazo compound was then salted out with about 200 parts of sodium chloride. It was filtered and washed with 15% sodium chloride solution The residue was dissolved in 500 parts of water at 90° C. and filtered with charcoal, to remove the excess cresidine.

This amino azo compound was then diazotized at 10° C. by adding 30 parts of 10X normal hydrochloric acid solution and 50 parts of 2X normal sodium nitrite solution and stirring for one hour. This diazo compound was then coupled with phenol in a solution containing 9.4 parts of phenol and 10 parts of 10X normal sodium hydroxide solution and 60 parts of 2X normal sodium carbonate solution in 500 parts of water. When the coupling was complete the dye was salted out at 70° C. with 10% sodium chloride, removed by filtration and dried. This product dyed wool an orange brown shade and is represented by the following formula:

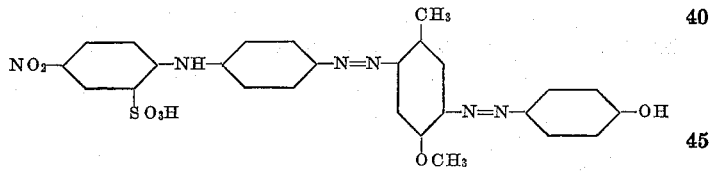

A portion of the compound was condensed with diethyl sulphate by treatment at 60°–70° C. in an alkaline solution forming an ether group. This product dyed wool an orange brown shade of good fastness to washing, fulling and alkaline perspiration.

The compound is represented by the formula:

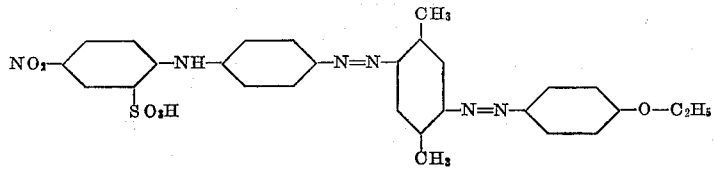

Example II

The mixture containing diazotized 4-nitro-4'-amino-diphenylamine-2-sulphonic acid described in Example I was neutralized and added to a solution containing 24.5 parts of the sodium salt of alpha-naphthylamine-7-sulphonic acid in 400 parts of water. After the coupling was complete, the mixture was made slightly alkaline with 9.0 parts of sodium carbonate and salted out at 60° C. with salt. The monazo dye was filtered off, and washed with a 10% salt solution. The monazo compound can be separated with good results from an alkaline or a neutral solution.

The monazo compound was then stirred into 1,000 parts of water at 60° C., cooled to 30° C. with ice, and then diazotized by adding 25 parts of 10X normal hydrochloric acid solution and 50 parts of 2X normal sodium nitrite solution. After stirring ½ hour the mineral acidity was neutralized with 7.0 parts of sodium acetate crystals.

This diazotized compound was coupled with phenol by adding 9.4 parts of phenol and subsequently making the mixture alkaline with 8.0 parts of sodium carbonate. The disazo dye was salted out from the slightly alkaline medium at 70° C. with salt, filtered off and dried in a suitable manner. The product dyed wool a red brown. The compound is represented by the formula:

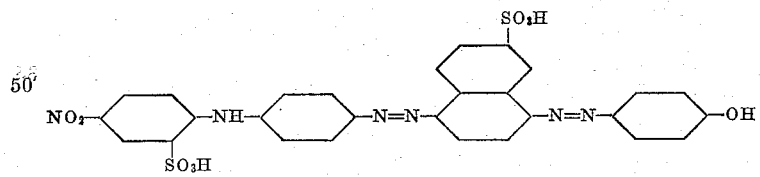

The product was converted to its ethyl ether by the following treatment. 0.01 mole part of the hydroxy-disazo compound was dissolved in 150 parts of water and heated to 65–70° C. The solution was treated with small amounts of diethyl-sulphate while maintaining the solution alkaline to brilliant yellow by additions of sodium hydroxide. The treatment was continued until a test portion was no longer sensitive to an aqueous solution of sodium hydroxide and the resulting ether was filtered off and dried.

Its wool dyeings were reddish brown in shade and were brighter than a corresponding para-toluene-sulphon chloride condensation product which can be made from the disazo compound. The fastness properties were satisfactory. The compound is represented by the following formula:

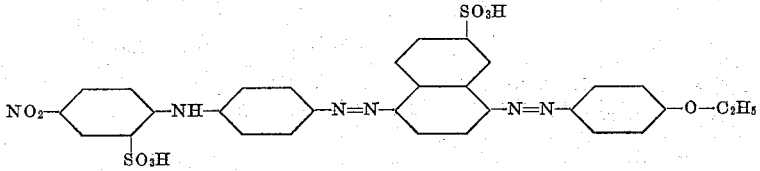

Example III 12.2 parts symmetrical xylenol (3,5-dimethyl-phenol) were used instead of 9.4 parts of phenol in the procedure of Example II.

The disazo product dyed wool red brown shades.

A portion of the product was condensed with p-nitro-benzoyl-chloride. The resulting brown colored product was isolated by filtration. It was much less sensitive to sodium hydroxide than the uncondensed compound. A part of it was used for dyeing wool. Brown dyeings were obtained. The latter compound is represented by the formula:

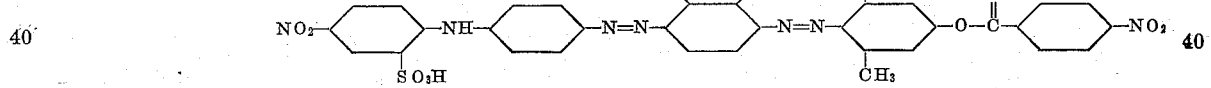

Example IV 1-naphthylamine-6-sulphonic acid was used instead of 1-naphthylamine-7-sulphonic acid in Example II. A redder brown dye represented by the following formula was obtained:

 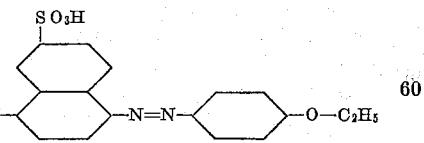

Example V

Alpha-naphthylamine was used instead of 1-naphthylamine-7-sulphonic acid in Example II. A brown dye was obtained which is represented by the following formula:

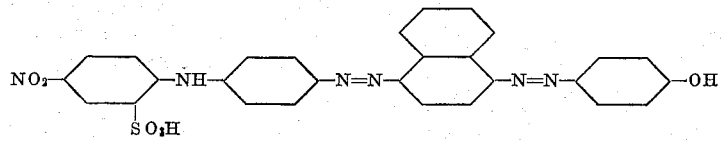

This disazo dye was alkylated with dimethyl sulphate. The dye was less sensitive to alkalies than the uncondensed disazo compounds. The products gave shades of brown dyeings on wool.

*Example VI*

30.9 parts of diazotized 4-nitro-4'-amino-diphenylamine-2-sulphonic acid prepared as described in Example I were added to a solution containing 25 parts of 2-amino-8-naphthol-6-sulphonic acid, 4 parts of sodium hydroxide and 20 parts of sodium carbonate in 250 parts of water at 10° C.

The monazo compound was salted out of solution at 60° C. with 250 parts of salt, filtered and washed with 20% brine. The compound was redissolved in 500 parts of water and diazotized upon adding 120 parts of 2X normal hydrochloric acid and 45 parts of sodium nitrite. After one hour the diazotized mixture was cooled to 10° C., and 9 parts of phenol were added, followed by 80 parts of 2X normal sodium hydroxide solution. The disazo color was salted out with about 100 parts of salt and filtered off.

The product is represented by the formula:

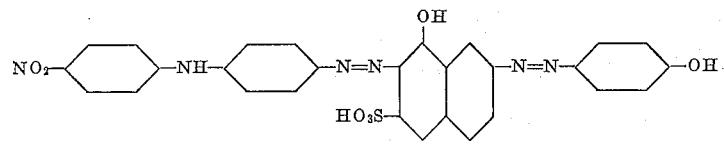

This disazo color was condensed with diethyl sulphate giving a product having good fastness properties. The product is represented by the formula

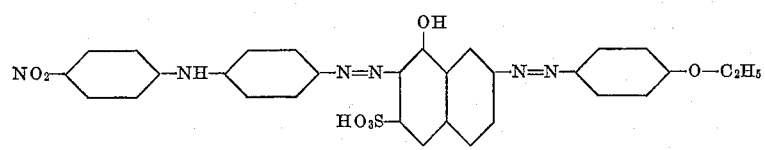

Considerable variation in the constituents used in preparing the dyes of the invention may be made. Thus some of the properties of the dyes are varied. For the first component an isomer of the nitro-amino-diphenylamine-sulphonic acid mentioned in the examples can be used. The nitro-amino-diphenylamine-sulphonic acid may be substituted by other groups such as alkyl, alkoxy, halogen, nitro and another sulphonic acid group. In diazotizing the first component it is preferable to add the nitrite to an alkaline solution of the nitro-amino-diphenylamine-sulphonic acid and then add this mixture to a mineral acid solution as more specifically described in the examples.

The first coupling or middle component consists of a member of the type of primary aryl amino derivatives, ordinarily used as middle components in secondary disazo dyes. The coupling must take place in a position that is not adjacent to the primary amino group and the amino group must be capable of being diazotized after the coupling. Other substituent groups may be present, such as alkyl, alkoxy, acyl-amino (—NH acyl), aryl, halogen, carboxyl and sulphonic acid so long as they do not interfere with the coupling and subsequent diazotization of the monazo compound. Among the intermediates which may be used are aniline (coupled by means of its omega-sulphonic-acid derivative), meta-toluidine, cresidine, 2:5-dimethoxy-aniline, alpha-naphthylamine, 1:6 and 1:7 Cleve's acids and mixtures thereof, 2-amino-6-naphthols, 2-amino-7-naphthols, 2-amino-8-naphthol-6-sulphonic acid, 2-amino-8-naphthol-3,6-disulphonic acid, 2-amino-5-naphthol-7-sulphonic acid, and 1-amino-5-naphthol-7-sulphonic acid. It is preferred to use as the second component a primary aryl amine having a free coupling position para to the amino group.

For the end coupling component hydroxy aryl compounds of the benzene and naphthalene series and their substituted products can be used. These compounds may be substituted by a variety of groups so long as the groups do not interfere with the coupling, such as alkyl, alkoxy, halogen, amino, carboxy and sulphonic acid. As examples of such compounds are mentioned 3-hydroxy-anisol and resorcin, but phenols and substituted phenols have given the best results.

The preferred mode of protecting or blocking the hydroxyl of the end group of the disazo compound comprises the condensation of the hydroxyl with compounds to form ester and ether groups. By blocking is meant the conversion of the hydroxyl group to a neutral unionizable group, that is incapable of forming alkali salts with alkaline substances. Esters are preferably formed by condensing with an acylating compound, i. e. compounds which introduce —CO-alkyl or —CO-aryl groups. Examples are alkyl or aryl carboxylic acid compounds, such as acetic anhydride or an aroyl halide. Ethers are formed by condensing with alkylating compounds, such as dialkyl sulphates and alkyl halides.

Aroyl halides containing a benzene or naphthalene nucleus can be used. For example, benzoyl bromide or 2-naphthoyl chloride can be used instead of p-nitro-benzoyl-chloride mentioned in Example III.

The alkyl group present in the alkylating or in the acylating compound may contain from 1 to 12 carbon atoms, but preferably contains 1 to 3 carbon atoms.

The following general formula represents the constitution of the preferred combinations:

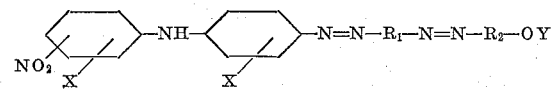

where one X represents —H and the other represents —SO₃H. R₁ is an unsubstituted or substituted benzene or naphthalene nucleus. R₂ is the residue of a hydroxy aryl compound and Y is alkyl, or acyl.

For the purposes of dyeing silk and wool in neutral baths the esters and ethers of the disazo compounds are preferred, such as those in which the hydroxy of the end component is protected by condensation with an aroyl halide or an alkyl sulphate. In preparing the disazo compound the best results are obtained by isolating the monazo product from a neutral or alkaline solution.

For dyeing 100 parts of wool in neutral bath about 1 part of dye may be used in a solution containing about 10 parts of sodium sulphate crystals in 100 parts of water. The procedure may desirably consist of turning over the wool in the solution for about 10 minutes at room temperature, heating the dye bath over a period of about 15 minutes to a temperature approximating 90° to 100° C. and holding the solution at this temperature whilst turning over the wool therein for about 30 minutes. The material is then taken out.

In preparing the monazo compounds in acid coupling medium it is to be understood that neutralization of the free acid therein before separating the monazo compound is not essential since this compound can be separated from the acidic medium. However, we prefer to make this coupling medium nonacid, that is neutral or alkaline before separating the monazo compound since it has been found that the preferred procedure as recited in the examples results in the production of purer and brighter intermediate and end products than are produced when the monazo compound is separated from the acid medium.

As numerous variations besides those which have been specifically mentioned can be made without departing from the spirit and scope of the invention as will be understood by those skilled in the art, it is to be understood that no limitations are intended in the annexed claims except those which are specifically recited or are imposed by the prior art.

We claim:

1. A compound made by coupling a diazotized 4-nitro-4'-amino-diphenylamine-sulphonic acid with a primary aryl amine having a free coupling position non-adjacent to an amino group which is diazotizable when coupled, diazotizing said product of coupling and coupling the same with a hydroxy aryl compound, and blocking the end hydroxyl of said disazo compound by condensing the hydroxyl with one of the group consisting of an alkylating compound and an acylating compound.

2. A compound made by coupling a diazotized 4-nitro-4'-amino-diphenylamine-sulphonic acid represented by the formula

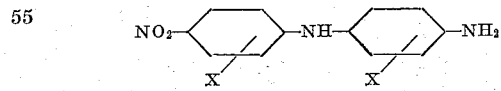

in which one X is hydrogen and the other X is sulphonic acid, with a primary aryl amine having a free coupling position non-adjacent to an amino group which is diazotizable when coupled, diazotizing said product of coupling and coupling the same with a hydroxy aryl compound, and blocking the end hydroxyl of said disazo compound by condensing the hydroxyl with one of the group consisting of an alkylating compound and an acylating compound.

3. A compound made by coupling a diazotized 4-nitro-4'-amino-diphenylamine-sulphonic acid substituted by at least one of the group consisting of alkyl, alkoxy, halogen, nitro, and sulphonic acid with a primary aryl amine having a free coupling position nonadjacent to an amino group which is diazotizable when coupled, diazotizing said product of coupling and coupling the same with a hydroxy aryl compound, and blocking the end hydroxyl of said disazo compound by condensing the hydroxyl with one of the group consisting of an alkylating compound and an acylating compound.

4. A compound made by coupling a diazotized 4-nitro-4'-amino-diphenylamine-sulphonic acid with a primary aryl amine substituted by at least one of the group consisting of alkyl, alkoxy, halogen, acyl-amino, sulphonic acid and carboxy having a free coupling position non-adjacent to an amino group which is diazotizable when coupled, diazotizing said product of coupling and coupling the same with a hydroxy aryl compound, and blocking the end hydroxyl of said disazo compound by condensing the hydroxyl with one of the group consisting of an alkylating compound and an acylating compound.

5. A compound made by coupling a diazotized 4-nitro-4'-amino-diphenylamine-sulphonic acid with a primary aryl amine having a free coupling position non-adjacent to an amino group which is diazotizable when coupled, diazotizing said product of coupling and coupling the same with a hydroxy aryl compound substituted by at least one of the group consisting of alkyl, alkoxy, halogen, amino, sulphonic acid and carboxy and blocking the end hydroxyl of said disazo compound by condensing the hydroxyl with one of the group consisting of an alkylating compound and an acylating compound.

6. A compound made by coupling a diazotized 4-nitro-4'-amino-diphenylamine-sulphonic acid with a primary aryl amine having a free coupling position para to amino, diazotizing said product of coupling and coupling the same with a hydroxy aryl compound, and blocking the end hydroxyl of said disazo compound by condensing the hydroxyl with one of the group consisting of an alkylating compound and an acylating compound.

7. A compound represented by the formula

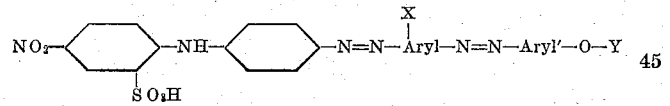

in which Aryl is the residue of an aryl amine of the group consisting of the benzene and naphthalene series coupled in a position non-adjacent to its amino group, X is at least one of a group consisting of hydrogen, alkyl, alkoxy, halogen, sulphonic acid and carboxy, Aryl' is a residue of a hydroxy compound of the group consisting of a hydroxy benzene compound and hydroxy naphthalene compound and Y is the residue of the group consisting of an aroyl halide and a dialkyl ester of an inorganic acid.

8. The process which comprises coupling a diazotized 4-nitro-4'-amino-diphenylamine-sulphonic acid and an aryl amine in a coupling position of said aryl amine which is non-adjacent to the amino group, diazotizing the product of coupling, coupling said product in alkaline reaction medium with a hydroxy compound selected from the group consisting of the hydroxy benzenes and their derivatives and the hydroxy naphthalenes and their derivatives, and condensing the disazo compound thus produced with an agent adapted to block said hydroxy group.

9. The process which comprises coupling a diazotized 4-nitro-4'-amino-diphenylamine-sulphonic acid and an aryl amine in a coupling position of said aryl amine which is non-adjacent to pling, coupling said product in alkaline reaction medium with one of the group consisting of a hydroxy benzene and a derivative of a hydroxy benzene, and condensing the disazo compound thus produced with an agent adapted to block said hydroxy group.

10. The process which comprises coupling a diazotized 4-nitro-4'-amino-diphenylamine-sulphonic acid and an aryl amine in a coupling position of said aryl amine which is non-adjacent to the amino group, diazotizing the product of coupling, coupling said product in alkaline reaction medium with a hydroxy compound selected from the group consisting of the hydroxy benzenes and their derivatives and the hydroxy naphthalenes and their derivatives and condensing the disazo compound thus produced with one of the group of blocking agents consisting of aliphatic and aromatic acylating compounds and alkylating compounds.

11. A compound represented by the formula

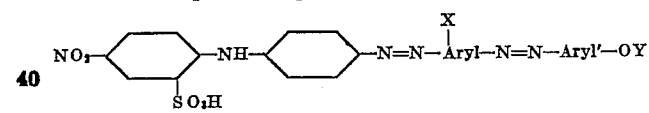

in which Aryl is the residue of one of the group consisting of benzene and naphthalene and to which the azo bridges are connected in non-adjacent positions, X is at least one of the group consisting of hydrogen, alkyl, alkoxy, halogen, sulfonic acid and carboxy, Aryl' is the residue of a hydroxy benzene compound and Y is the residue of one of the group consisting of an aroyl halide and a dialkyl ester of an inorganic acid.

12. A compound represented by the formula

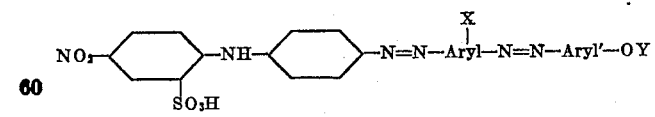

in which Aryl is the residue of one of the group consisting of benzene and naphthalene and to which the azo bridges are connected in non-adjacent positions, X is at least one of the group consisting of hydrogen, alkyl, alkoxy, halogen sulfonic acid and carboxy, Aryl' is the residue of an alkyl substituted phenol and Y is the residue of one of the group consisting of an aroyl halide and a dialkyl ester of an inorganic acid.

13. A compound represented by the formula

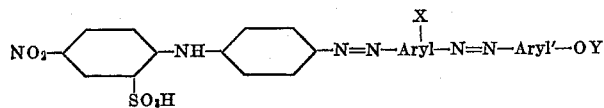

in which Aryl is the residue of one of the group consisting of benzene and naphthalene and to which the azo bridges are connected in non-adjacent positions, X is at least one of the group consisting of hydrogen, alkyl, alkoxy, halogen, sulfonic acid and carboxy, Aryl' is the residue of phenol and Y is the residue of one of the group consisting of an aroyl halide and a dialkyl ester of an inorganic acid.

14. A compound represented by the formula

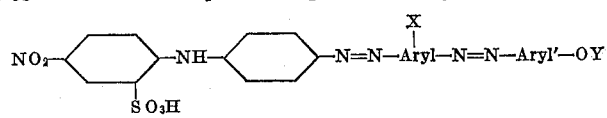

in which Aryl is the residue of one of the group consisting of benzene and naphthalene and to which the azo bridges are connected in non-adjacent position, X is at least one of the group consisting of hydrogen, alkyl, alkoxy, halogen, sulfonic acid and carboxy, Aryl' is the residue of xylenol and Y is the residue of one of the group consisting of an aroyl halide and a dialkyl ester of an inorganic acid.

15. A compound represented by the formula

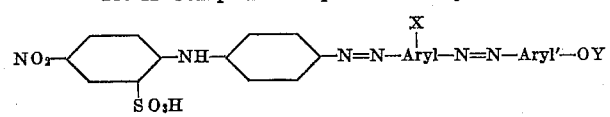

in which Aryl is the residue of a 1-naphthylamine-sulfonic acid and to which the azo bridges are connected in para positions, X is at least one of the group consisting of hydrogen, alkyl, alkoxy, halogen, sulfonic acid and carboxy, Aryl' is the residue of a hydroxy benzene compound and Y is the residue of one of the group consisting of an aroyl halide and a dialkyl ester of an inorganic acid.

16. A compound represented by the formula

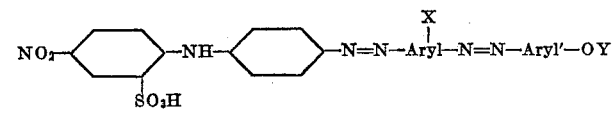

in which Aryl is the residue of an amino-naphthol sulfonic acid and to which the azo bridges are connected in non-adjacent positions, X is at least one of the group consisting of hydrogen, alkyl, alkoxy, halogen, sulfonic acid and carboxy, Aryl' is the residue of a hydroxy benzene compound and Y is the residue of one of the group consisting of an aroyl halide and a dialkyl ester of an inorganic acid.

HERBERT W. DAUDT.
HAROLD E. WOODWARD.

Certificate of Correction

Patent No. 2,124,689.                                                        July 26, 1938.

HERBERT W. DAUDT, ET AL.

It is hereby certified that error appears in the printed specification of the above numbered patent requiring correction as follows: Page 1, second column, lines 55 to 60 inclusive, for that portion of the formula reading

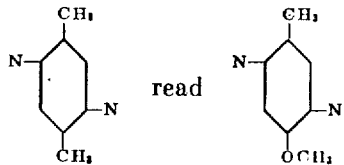

and that the said Letters Patent should be read with this correction therein that the same may conform to the record of the case in the Patent Office.

Signed and sealed this 27th day of September, A. D. 1938.

[SEAL]                                                                 Henry Van Arsdale

*Acting Commissioner of Patents.*